(12) United States Patent
Verechtchiagine (10) Patent No.: US 7,492,315 B2
(45) Date of Patent: Feb. 17, 2009

(54) GEOFENCING AND ROUTE ADHERENCE IN GLOBAL POSITIONING SYSTEM WITH SIGNALS FROM FEWER THAN THREE SATELLITES

(75) Inventor: Dimitri Verechtchiagine, Ottawa (CA)

(73) Assignee: Transcore Link Logistics Corporation (CA)

( * ) Notice: Subject to any disclaimer, the term of this patent is extended or adjusted under 35 U.S.C. 154(b) by 0 days.

(21) Appl. No.: 11/692,665

(22) Filed: Mar. 28, 2007

(65) Prior Publication Data

US 2008/0238769 A1 Oct. 2, 2008

(51) Int. Cl.
G01S 5/14 (2006.01)
(52) U.S. Cl. .................................. 342/357.08
(58) Field of Classification Search ............ 342/357.06, 342/357.07, 357.08, 357.12, 357.13, 357.17; 702/152
See application file for complete search history.

(56) References Cited

U.S. PATENT DOCUMENTS

| | | | | |
|---|---|---|---|---|
| 3,384,891 | A | * | 5/1968 | Anderson .............. 342/357.01 |
| 5,452,211 | A | * | 9/1995 | Kyrtsos et al. ......... 342/357.01 |
| 5,867,122 | A | * | 2/1999 | Zahm et al. ............ 342/357.07 |
| 5,977,909 | A | * | 11/1999 | Harrison et al. ........ 342/357.13 |
| 2004/0021567 | A1 | | 2/2004 | Dunn |

OTHER PUBLICATIONS

"GPS Receiver Structures for the Urban Canyon", Peterson B. et al., Proceedings of the Institute of Navigation, Jan. 1, 1995, pp. 1323-1332.
"A Low Cost Vehicle Location and Tracking System", Brown, A. ed., 500 Years after Columbus, Navigation Challenges of Tomorrow, Monterey, CA. Mar. 23-27, 1992, Proceedings of the Position, Location and Navigation Symposium, IEEE, US vol. 23, Mar. 1992 pp. 516-523.

* cited by examiner

Primary Examiner—Thomas H Tarcza
Assistant Examiner—Fred H Mull
(74) Attorney, Agent, or Firm—Caesar, Rivise, Bernstein, Cohen & Pokotilow, Ltd.

(57) ABSTRACT

Particular implementations are particularly useful in providing a system in which the hardware is more easily upgradable and new hardware functionality may be added without adding any new physical hardware. Through placement of an FPGA closely associated with the CPU of a personal computer, the FPGA may be reconfigured to act as new hardware. A system for installing new virtual hardware involves loading firmware into memory associated with the FPGA and reconfiguring the FPGA through a microcontroller. Particular implementations include universal ports associated with the FPGA into which adapter plugs can be placed to quickly adapt to any device that may be added through the virtual hardware use of the FPGA. Other implementations include high density connectors into which a plurality of ports of varying configurations may be plugged for connection of external electronic equipment through the FPGA.

20 Claims, 7 Drawing Sheets

GEOFENCING AND ROUTE ADHERENCE IN GLOBAL POSITIONING SYSTEM WITH SIGNALS FROM FEWER THAN THREE SATELLITES

FIELD OF THE INVENTION

The present invention is directed to a system, method and article of manufacture for GPS location and more particularly to such a system, method and article of manufacture in which a minimum distance from a GPS receiver to a nearby reference location is determined when there are fewer than three GPS satellites in view.

DESCRIPTION OF RELATED ART

One of the major problems in the use of satellite navigation is blockage of the view of GPS satellites. The blockage is often only partial, with only a few satellites visible and the rest being blocked by trees, buildings and other obstacles. To obtain a GPS fix, a GPS receiver without an on-board atomic clock generally needs to have at least 4 satellites in view (this is called a 3D GPS fix.). With an assumed receiver altitude (typically from a previous 3D fix), only 3 satellites are necessary (so called 2D fix.)

With only two satellites in view, it is impossible to determine the receiver's current location. However, a geometrical surface of the possible user locations, or the Solution Surface, can be determined. In general, knowing the Solution Surface is not very useful, since it is not a bounded area.

SUMMARY OF THE INVENTION

A need therefore exists in the art to provide useful information in situations in which fewer than three satellites are in view.

It is therefore an object of the invention to be able to derive such information.

To achieve the above and other objects, the present invention is directed to a technique in which, for a known reference (base) location (e.g. the receiver's location in the past, or some other position of interest), the distance from this location to the Solution Surface can be computed. That distance is equal to the minimum possible distance between the base location and a current user position. In other words, that distance is how far from the base position the receiver is guaranteed to be.

In a geofence application, the geofence anchor location is set to be the base location; comparing the distance from the anchor location to the Solution Surface with the geofence radius, we can generate a Departure Geofence Crossing Event.

The route adherence algorithm is similar to the geofencing algorithm, except that the minimum-distance test is applied over a set of points or line segments defining a route.

Given a reference (base) geographical location that is known to be relatively close to the current receiver's location compared to the distance to the satellites, the distance from this location to the solution surface can be computed, and that distance is the minimum possible distance from the base location to the current receiver's location. The present disclosure contains the formulae to compute that distance.

In addition to covering the basic techniques for computing the distance from a base point of interest to the solution surface, some geofencing and route adherence applications are discussed and explored. Application of those algorithms would provide better availability of geofence monitoring and route adherence testing in limited GPS satellite visibility environments.

In other embodiments, an alternate derivation for the linearized solution space equation is shown, and a similar positioning technique with a single satellite and a high accuracy terminal clock is detailed.

Throughout the present disclosure, the following terminology will be used:

User and Receiver are used interchangeably.

Location and Position are used interchangeably.

ECEF—Earth centered, Earth fixed coordinate system (e.g. WGS-84 or ITRF2000)

Base Location—A reference location the distance to which we are interested in.

Geofence Anchor Position—The geographical position where geofence monitored object is expected to be on average.

User Coordinate Frame—a coordinate system rotated so that the basis vectors point in cardinal directions (e.g. east, north and up) at the user or base location. The origin of the coordinate system does not need to be at the user or base location.

Locally Horizontal Plane—A horizontal plane in the user coordinate frame at the base location. This plane is parallel to the WGS-84 ellipsoid at the user location (tangent if the altitude is zero with respect to the WGS-84 ellipsoid).

Solution Surface—A geometrical surface of possible user positions obtained from the GPS equations for two satellites.

Solution Plane—A linearized approximation to the solution surface.

Horizontal Solution Line—The line formed by the intersection of the solution plane with the locally horizontal plane.

Departure Geofence Crossing Event (DGCE)—The event generated by a geofence software application indicating that a tracked object is moving outside of the circle with a given geofence radius.

In addition, throughout the present disclosure, the following notation will be used:

$\vec{x}_{S,i} = [x_{S,i}\ y_{S,i}\ z_{S,i}]$ The i-th satellite position vector (typically but not necessarily in ECEF coordinates).

$\vec{x}_U = [x_U\ y_U\ z_U]$ The user's position vector (also typically in ECEF coordinates).

$\vec{r}_i = \vec{x}_{S,i} - \vec{x}_U$ The range vector from the user position to the i-th satellite.

$\vec{l}_i = \vec{r}_i / |\vec{r}_i|$ The line of sight vector from the user position to the i-th satellite position.

$\vec{x}_B$ The base position. This is often a previous user position but could be any location of interest in general.

$\vec{r}_{i,B}$ The range vector from base position to the i-th satellite.

$\vec{l}_B$ The line-of-sight vector from the base position to the i-th satellite position.

$\vec{\delta}_U = \vec{x}_U - \vec{x}_B$ The displacement vector from the base position to the current user position.

$b_U$ The clock bias of the receiver's clock.

$\rho_i = r_i + b_U$ The pseudorange to the i-th satellite.

$N_S$ The number of satellites used in computation.

$D_{(SPl,B)}$ The distance from the base position to the Solution Plane.

$D_{(SLn,B)}$ The distance from the base position to the Solution Line.

$\lambda_{S_{1,2}} = \angle \vec{1}_1 \vec{1}_2$ The angle between the line-of-sight vectors of $SV_1$ and $SV_2$.

$\lambda_{S_{1,2}}^{min}$ The minimum angle between $SV_1$ and $SV_2$ allowing geofence monitoring.

$F_{conf}$ The confidence factor used in the computation of $\lambda_{S_{1,2}}^{min}$.

$\sigma_\rho$ The root-mean-square error of a pseudorange estimate.

$\sigma_{\rho_{1,2}} = \sqrt{2}\sigma_\rho$ The root-mean-square error of the pseudorange difference of $\rho_2 - \rho_1$.

$\vec{n}_{LHPl,B}$ The unitary vector normal to the locally horizontal plane at the base location.

$\Delta\rho = \rho_2 - \rho_1$ The pseudorange difference.

$\Delta r_B = r_{2,B} - r_{1,B}$ The true range difference at the base location.

$\lambda_{(SPl,LHPl)}$ The dihedral angle between the Solution Plane and the Locally Horizontal Plane.

BRIEF DESCRIPTION OF THE DRAWINGS

Preferred embodiments of the invention will be set forth in detail with reference to the drawings, in which.

DETAILED DESCRIPTION OF THE PREFERRED EMBODIMENTS

Preferred embodiments of the invention will now be set forth in detail with reference to the drawings, in which like reference numerals refer to like elements throughout.

In a first preferred embodiment, the distance is determined to a user position on a plane in the case of two satellites and a GPS receiver with a standard clock. The basic GPS fix equation can be written as:

$$\{\rho_i = r_i + b_U | i = 1, 2, \ldots N_S\} \quad (E10)$$

where $$r_i = |\vec{x}_{S,i} - \vec{x}_U| = \sqrt{(\vec{x}_{S,i} - \vec{x}_U) \cdot (\vec{x}_{S,i} - \vec{x}_U)} \quad (E20)$$

In Cartesian coordinates the equations in (E10) will take the following form:

$$\rho_i = \sqrt{(x_{S,i} - x_U)^2 + (y_{S,i} - y_U)^2 + (z_{S,i} - z_U)^2} + b_U \quad (E30)$$

Here $\rho_i$ are known measurements, $\vec{x}_{S,i}$ are computed from GPS navigation and observation data values, and $\vec{x}_U$ and $b_U$ are unknowns.

With two satellites in view, equation (E30) is a pair of dependent equations. By equating clock biases $b_U$ in (E30) for the two satellites we obtain:

$$\rho_1 - \sqrt{(x_{S,1} - x_U)^2 + (y_{S,1} - y_U)^2 + (z_{S,1} - z_U)^2} = \\ \rho_2 - \sqrt{(x_{S,2} - x_U)^2 + (y_{S,2} - y_U)^2 + (z_{S,1}^{(2)} - z_U)^2} \quad (E40)$$

Equation (E40) thus defines the Solution Surface.

The two dimensional profile of this surface (intersection with a plane) is a curve. In a coordinate system where both satellites and the receiver lie in the XY plane we can write the profile curve equation as:

$$\rho_1 - \sqrt{(x_{S,1} - x_U)^2 + (y_{S,1} - y_U)^2} = \\ \rho_2 - \sqrt{(x_{S,2} - x_U)^2 + (y_{S,2} - y_U)^2} \quad (E50)$$

We therefore have an implicit function $y_u = f(x_u)$ that can be plotted to gain some intuitive understanding of the Solution Surface's behaviour.

Figure 1A:
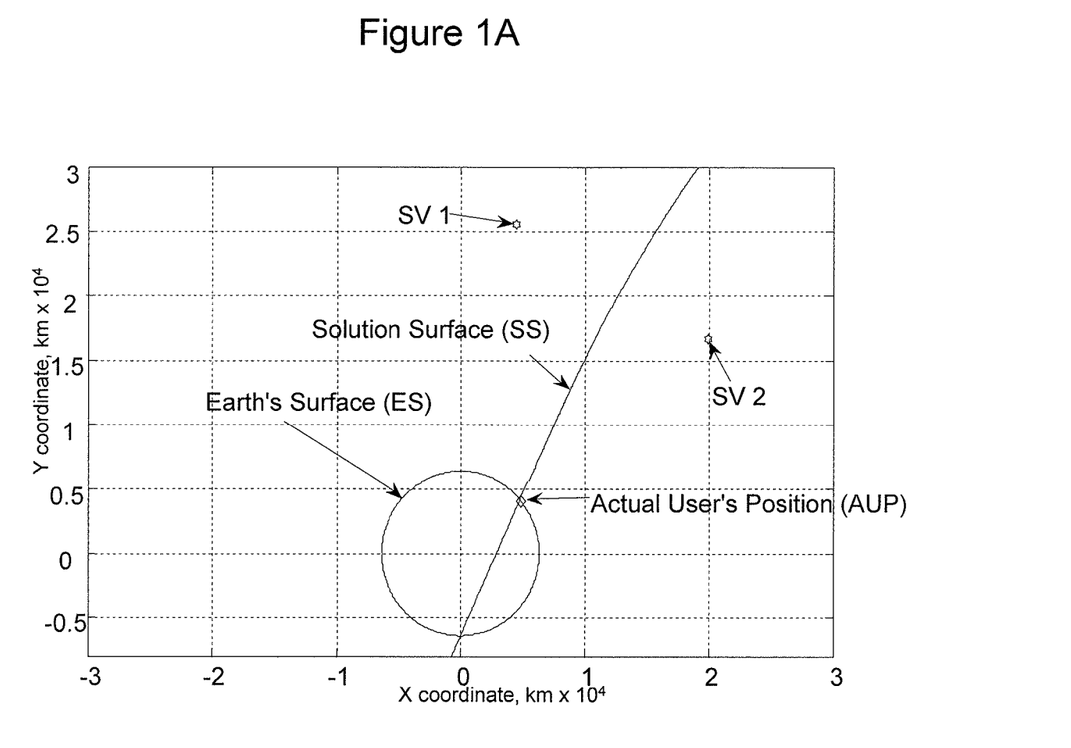
FIGS. 1A and 1B are diagrams which show examples of a Solution Surface for a first preferred embodiment.
Figure 1B:
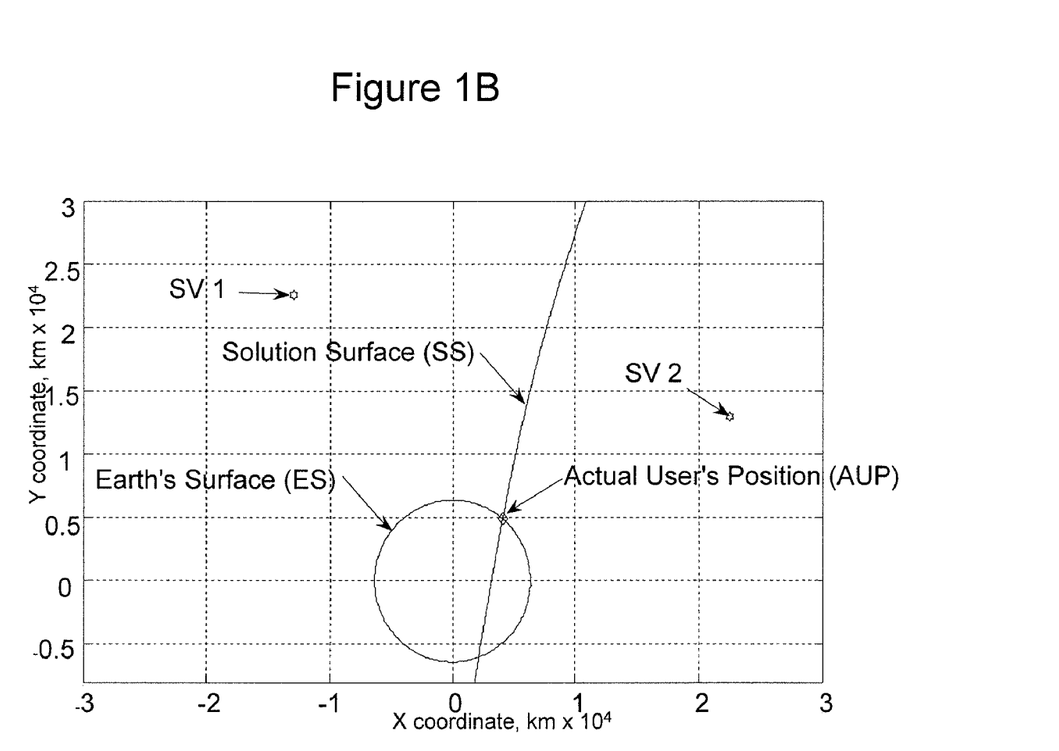

FIGS. 1A and 1B show examples of the Solution Surface profile curves for this case. In both of those figures, there are only two satellites visible, namely $SV_1$ and $SV_2$. The actual user's position AUP on the earth's surface ES cannot be determined unequivocally. However, a solution surface SS can be determined as disclosed above. Further, if the actual user's position AUP is known to be on the earth's surface ES, as opposed to being at some other location such as an airplane over the earth's surface, the intersection of the solution surface SS and the earth's surface ES is a curve on which the actual user's position AUP must be located.

To derive the solution plane equation, we linearize equations (E10) around the base location $\vec{x}_B$.

$$r_i = |\vec{x}_{S,i} - \vec{x}_U| = |\vec{x}_{S,i} - \vec{x}_B + \vec{\delta}_U| = |\vec{r}_{i,B} + \vec{\delta}_U| = \\ \sqrt{r_{i,B}^2 + 2 r_{i,B} \vec{\delta}_U \cdot \vec{l}_{i,B} + \delta_U^2} = r_{i,B}^{(i)} \sqrt{1 + 2\frac{\vec{\delta}_U}{r_{i,B}} \cdot \vec{l}_{i,B} + \left(\frac{\delta_U}{r_{i,B}}\right)^2}$$

For linearization, the distance to a satellite is assumed to be much greater than the displacement from the base location:

$$\frac{|\delta_U|}{|r_{i,B}|} \ll 1$$

We can then use the Taylor series approximation for the square root function:

$$\sqrt{1+\alpha} \approx 1 + 1/2\alpha; \quad |\alpha| \ll 1$$

so $$r_i \approx r_{i,B} + \vec{\delta}_U \cdot \vec{l}_{i,B}$$

And $$\rho_i \approx r_{i,B} + \vec{\delta}_U \cdot \vec{l}_{i,B} + b_U \quad (E60)$$

In the two-satellite case this is a pair of equations. Eliminating the clock bias by equating it in the two equations for $SV_1$ and $SV_2$ in (E60) we obtain:

$$\rho_1 - r_1 = \rho_2 - r_2$$

$$\rho_1 - (r_{1,B} + \vec{\delta}_U \cdot \vec{l}_{1,B}) = \rho_2 - (r_{2,B} + \vec{\delta}_U \cdot \vec{l}_{2,B})$$

$$\vec{\delta}_U \cdot (\vec{l}_{2,B} - \vec{l}_{1,B}) = \vec{\delta}_U \cdot \vec{\Delta l}_B = (\rho_2 - \rho_1) - (r_{2,B} - r_{1,B}) = \Delta\rho - \Delta r_B$$

Dividing both parts by $|\Delta \vec{l}_B|$ we have:

$$\vec{\delta}_U \cdot \frac{\Delta \vec{l}_B}{|\Delta l_B|} = \frac{\Delta\rho - \Delta r_B}{|\Delta l_B|} = -D_{(SPl,B)} \quad (E70)$$

Or $$(\vec{x}_U - \vec{x}_B) \cdot \frac{\Delta \vec{l}_B}{|\Delta l_B|} = -D_{(SPl,B)} \quad (E71)$$

The obtained equation (E71) is the Hessian normal form of the plane equation, where $|D_{(SPl,B)}|$ is the distance from the plane of possible user positions $\vec{x}_u$ to the point $\vec{x}_B$. $|D_{(SPl,B)}|$ is the minimum possible distance from the base position $\vec{x}_B$ to the unknown current user position $\vec{x}_u$.

We can rewrite $D_{(SPl,B)}$:

$$D_{(SPl,B)} = \frac{\Delta r_B - \Delta\rho}{|\Delta \vec{l}_B|} = \frac{\Delta r_B - \Delta\rho}{2 \cdot (1 - \cos \angle(\vec{l}_{1,B}, \vec{l}_{2,B}))} = \frac{\Delta r_B - \Delta\rho}{2 \cdot (1 - \cos\lambda_{S1,2,B})} \quad (E80)$$

A solution line equation will now be disclosed. In many cases it may be useful to assume that the user positions are constrained within the locally horizontal plane defined at the same altitude as the base position. In cases where the Solution Plane is significantly inclined with respect to the locally horizontal plane, and where motion is essentially horizontal, the minimum distance from the base position to the Solution Plane will greatly underestimate the actual distance of the user to the Solution Plane.

Figure 2:
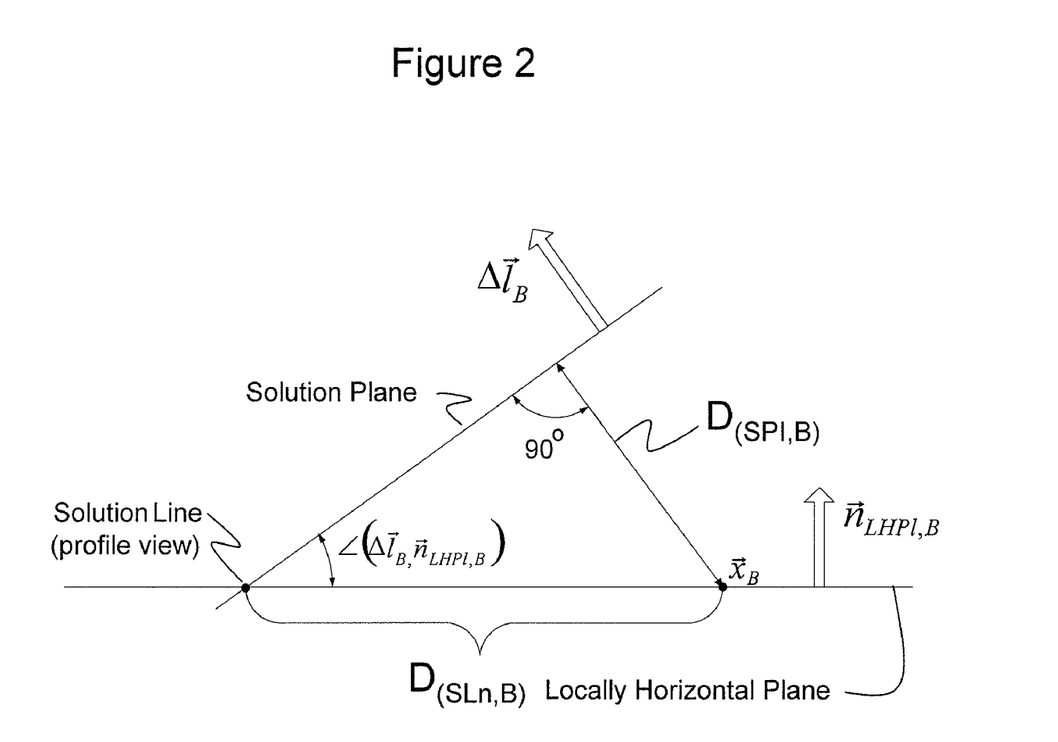
FIG. 2 is a diagram which shows the derivation of a solution line equation in a case in which the location of the receiver is assumed to be horizontally constrained.

With the assumption that the receiver is constrained to move within the Locally Horizontal Plane, as shown in FIG. 2, we have the receiver's solution space narrowed to the line (Solution Line SL) formed by the intersection of the Solution Plane SP and the Locally Horizontal Plane LHP. The distance to the Solution Line SL can be computed from the diagram of FIG. 2 by the following equation:

$$D_{(SLn,B)} = \frac{D_{(SPl,B)}}{\sin \angle \Delta \vec{l}_B \vec{n}_{LHPl,B}} = \frac{\Delta r_B - \Delta\rho}{2 \cdot (1 - \cos\lambda_{SV_{1,2},B}) \cdot \sin\lambda_{(SPl,LHPl)}} \quad (E90)$$

Note: the receiver position's constraining plane does not necessarily have to be the locally horizontal plane; however, this is the most likely scenario in realistic applications.

The sensitivity of $D_{(SPl,B)}$ and $D_{(SLn,B)}$ to pseudorange errors will now be considered. In satellite navigation it is common to define a constellation geometry quality factor known as dilution of precision. This unitless quantity is multiplied by the expected root-mean-square pseudorange error (assumed to be the same for all satellites) to estimate the positioning error.

The equivalents of the position dilution of precision (PDOP) used in a regular GPS fix in our case would be (for the distances to the Solution Plane and Solution Line respectively):

$$\Gamma_{Pl} = \frac{\sqrt{2}}{2 \cdot (1 - \cos\lambda_{SV_{1,2},B})} \quad (E91)$$

$$\Gamma_{Ln} = \frac{\sqrt{2}}{2 \cdot (1 - \cos\lambda_{SV_{1,2},B}) \cdot \sin\lambda_{(SPl,LHPl)}} \quad (E92)$$

The pseudorange estimate mean error would translate in the mean $D_{(SPl,B)}$ error as:

$$\sigma_{D_{(SPl,B)}} = \Gamma_{Pl} \cdot \sigma_\rho \quad (E93)$$

Similarly, the pseudorange estimate mean error would translate in the mean $D_{SLn,B}$ error as:

$$\sigma_{D_{(SLn,B)}} = \Gamma_{Ln} \cdot \sigma_\rho \quad (E93)$$

The $\sqrt{2}$ value in the numerators of E91 and E92 appears from an assumption that the pseudorange errors from each satellite are uncorrelated and have the same root-mean-square value $\sigma_\rho$, in which case $$\sigma_{\rho_{1,2}} = \sqrt{2} \cdot \sigma_\rho \quad (E95)$$

A table of sample values for $\Gamma_{Pl}(\lambda_{SV_{1,2}})$ is provided below, showing its dependence on the angle $\lambda_{SV_{1,2}}$ between the two satellite line-of-sight vectors.

TABLE 1

Values of $\Gamma(\lambda_{SV_{1,2}})$

| $\lambda_{SV_{1,2}}$ | 1° | 5° | 7° | 10° | 20° | 30° | 45° | 90° |
|---|---|---|---|---|---|---|---|---|
| $\Gamma$ | 4642.71 | 185.82 | 94.86 | 46.54 | 11.73 | 5.28 | 2.41 | 0.707 |

The table shows that the accuracy decreases dramatically for low values of $\lambda_{SV_{1,2}}$.

The departure geofence algorithm will now be derived. The purpose of the proposed algorithm is to generate an alarm when a tracked object departs from a known geofence anchor location (base location) for more than an allowed distance (geofence radius). The algorithm assumes only 2 GPS satellites are in view.

Figure 3:
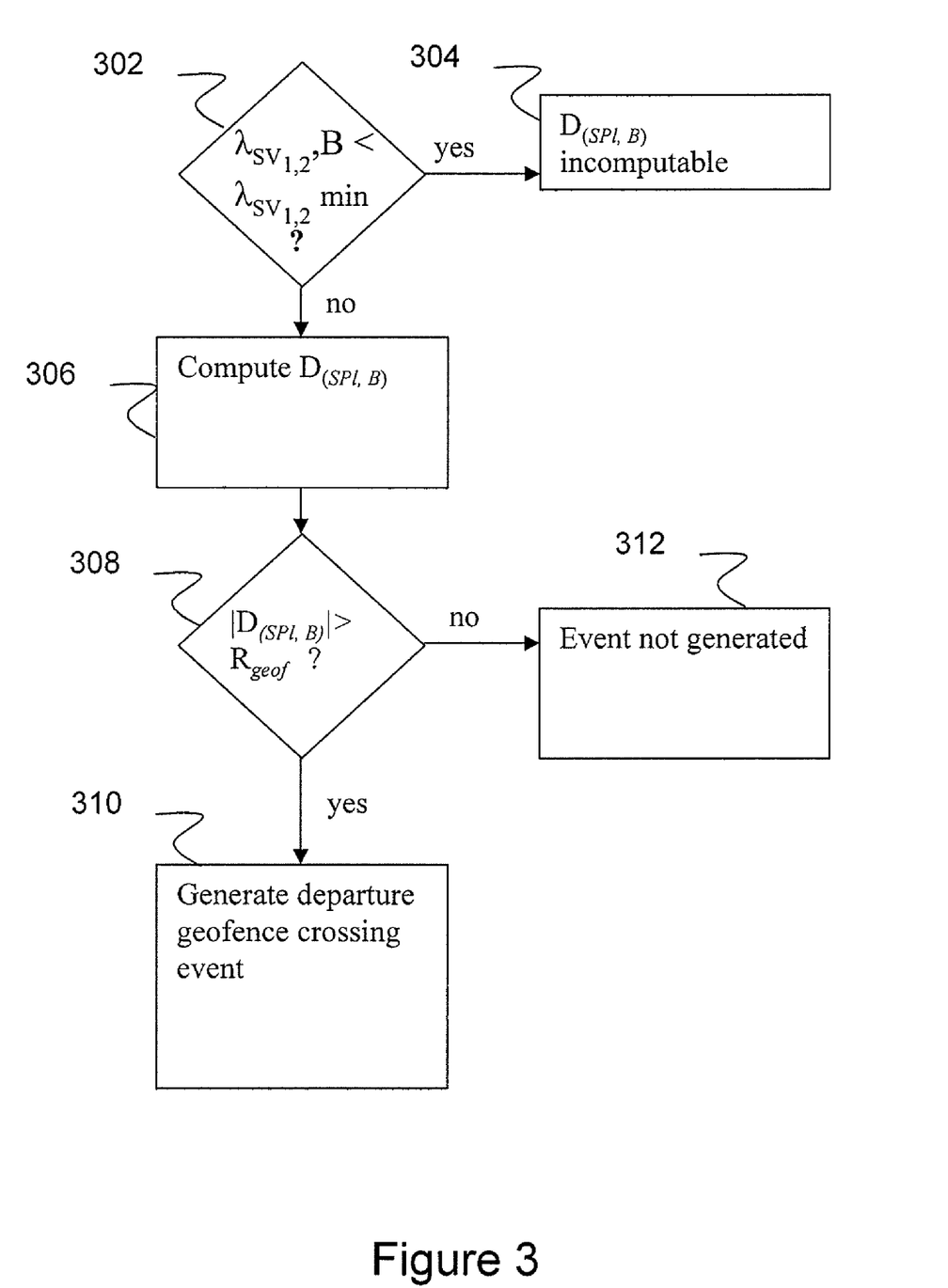
FIG. 3 is a flow chart showing the computation of the minimum distance and its comparison to a given geofence radius.

The algorithm is based on the computation of the $D_{(SPl,B)}$ value and comparing its absolute value against a given geofence radius $R_{geof}$. The algorithm comprises the following steps, shown in the flow chart of FIG. 3:

Step 302: Decide whether we can use the current satellite geometry. Compute $\lambda_{SV_{1,2},B}$. If $\lambda_{SV_{1,2},B} < \lambda_{SV_{1,2}}^{min}$ then $D_{(SPl,B)}$ shall be assumed incomputable in step 304, and geofence monitoring will be declared unavailable.

$\lambda_{SV_{1,2}}^{min}$ is a function of $R_{geof}$:

$$\frac{\sigma_\rho}{\sqrt{2} \cdot (1 - \cos\lambda_{SV_{1,2}}^{min})} = R_{geof} F_{conf} \quad (E100)$$

Hence $$\lambda_{SV_{1,2}}^{min} = \arccos\left(1 - \frac{\sigma_\rho}{\sqrt{2} R_{geof} F_{conf}}\right)$$

Step 306: Compute $D_{(SPl,B)}$. If it is determined in step 308 that $$|D_{(SPl,B)}| > R_{geof} \quad (E110)$$

generate the departure geofence crossing event in step 310. Otherwise, in step 312, the geofence crossing event is not generated.

The algorithm can be modified for use of $D_{(SLn,B)}$ instead of $D_{(SPl,B)}$.

The performance of the algorithm will now be discussed. The probability of a missed geofence crossing event is quite large due to a 'stealth' factor. When the receiver is moving within the Solution Plane, the computed $D_{(SPl,B)}$ value does not change and the receiver's movement remains undetected. The 'stealth' factor contribution to the missed detection rate is proportional to $$\frac{1}{R_{geof}^2}$$

for the receiver moving on the horizontal plane. The other factors contributing to missed detection are the pseudorange and satellite position errors.

The probability of false geofence crossing events (false alarms) is fully determined by the errors in $D_{(SPl,B)}$ caused by the errors in pseudorange estimates and satellite positions.

In a second preferred embodiment, a route adherence algorithm is used. The previous algorithm for geofencing, in which the minimum possible distance from a reference (base) position is computed, can be extended to route adherence testing by computing the minimum possible distance for a number of points along the route.

One approach is to approximate the route to be adhered to using a number of line segments in three-dimensional space, where the lengths of the line segments are short compared to the distance to the satellites (i.e. less than a few hundred kilometers). In that case, the linearized solution planes at each end of the line segment are approximately identical. For each line segment, there are four possible cases:

1. The line segment passes through the solution plane;

2. The line segment does not pass through the solution plane, and the first point on the segment is closest to the solution plane; or 3. The line segment does not pass through the solution plane, and the first point on the segment is closest to the solution plane; or 4. The line segment is exactly parallel to the solution plane In practice, the last case is extremely unlikely to occur, and for the purposes of determining the minimum distance over the segment, is equivalent to either case 2 or 3.

The route adherence algorithm computes the closest distance of approach of any solution plane to the entire route. If the minimum possible distance is greater than a selected threshold distance, then it is known that the user has not adhered to the route.

Figure 4:
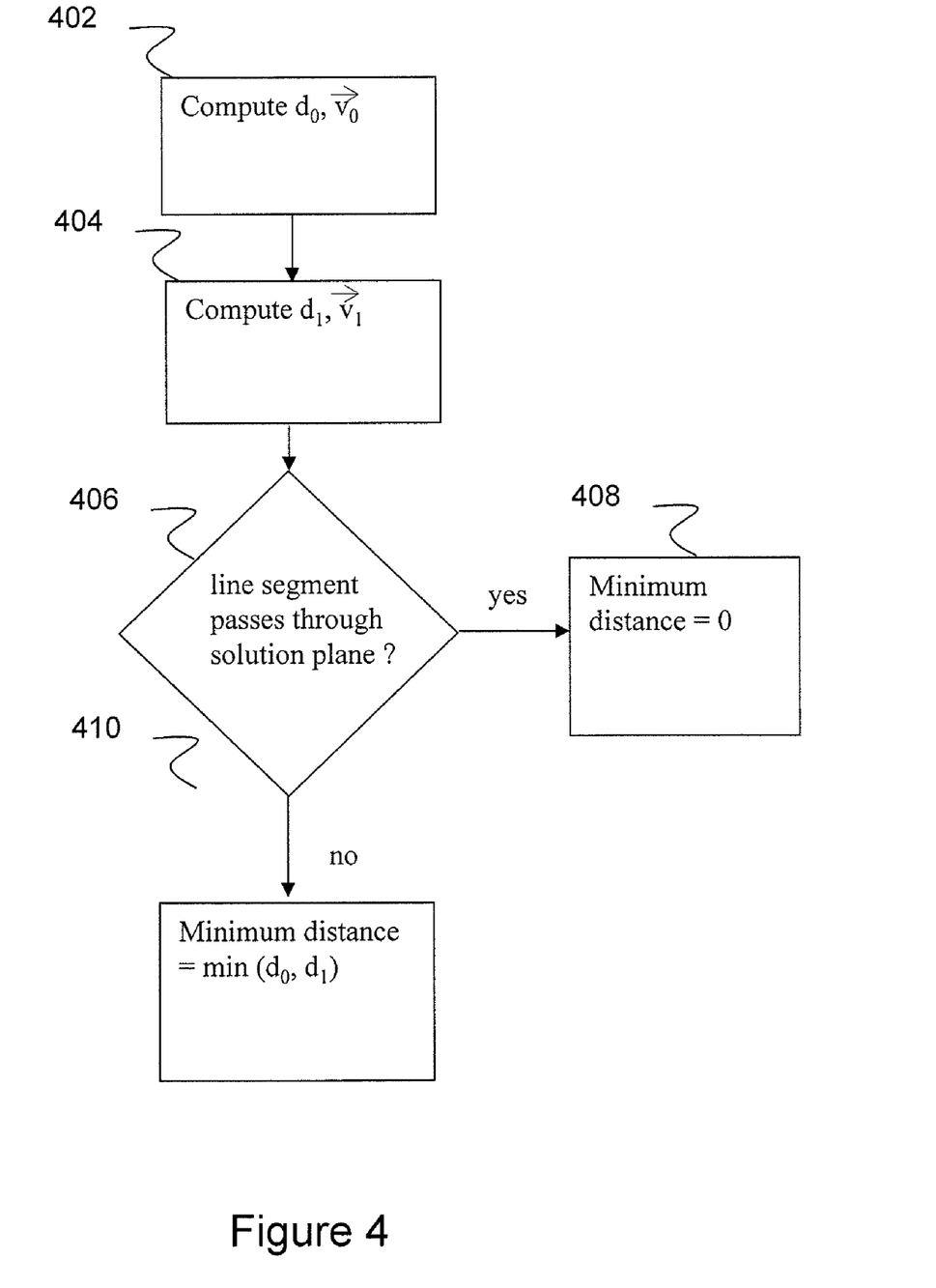
FIG. 4 is a flow chart showing the computation of the minimum distance to one of a plurality of line segments in a route.

The minimum distance algorithm for a single line segment is as follows, as shown in the flow chart of FIG. 4:

Step 402: For the first point in each line segment, compute $d_0 = D_{(SPl,B)}$ and the normal vector $$\vec{v}_0 = \frac{\Delta \vec{l}_B}{\text{sign } D_{(SPl,B)}},$$

with the first point of the segment used as the base

Step 404: For the second point in each line segment, compute $d_1 = D_{(SPl,B)}$ and the normal vector $$\vec{v}_1 = \frac{\Delta \vec{l}_B}{\text{sign } D_{(SPl,B)}},$$

with the second point of the segment used as the base

Step 406: Determine whether the line segment passes through the solution plane by computing the sign of $\vec{v}_0 \cdot \vec{v}_1$. If it is positive, the line segment doesn't pass through the solution plane. If it is negative, it is determined in step 408 that the line segment passes through the solution plane, and the minimum distance over the line segment is 0.

Step 410: If the line segment doesn't pass through the solution plane, then the minimum distance of the line segment to the solution plane is $\min(d_0, d_1)$.

This basic algorithm could be applied over the full set of line segments describing the route in a number of ways. For example, the algorithm could be applied over each line segment and the global minimum could be found. Alternatively, the set of line segments to be searched could be restricted to a subset using side information such as that last known user position and the maximum possible speed.

Figure 5:
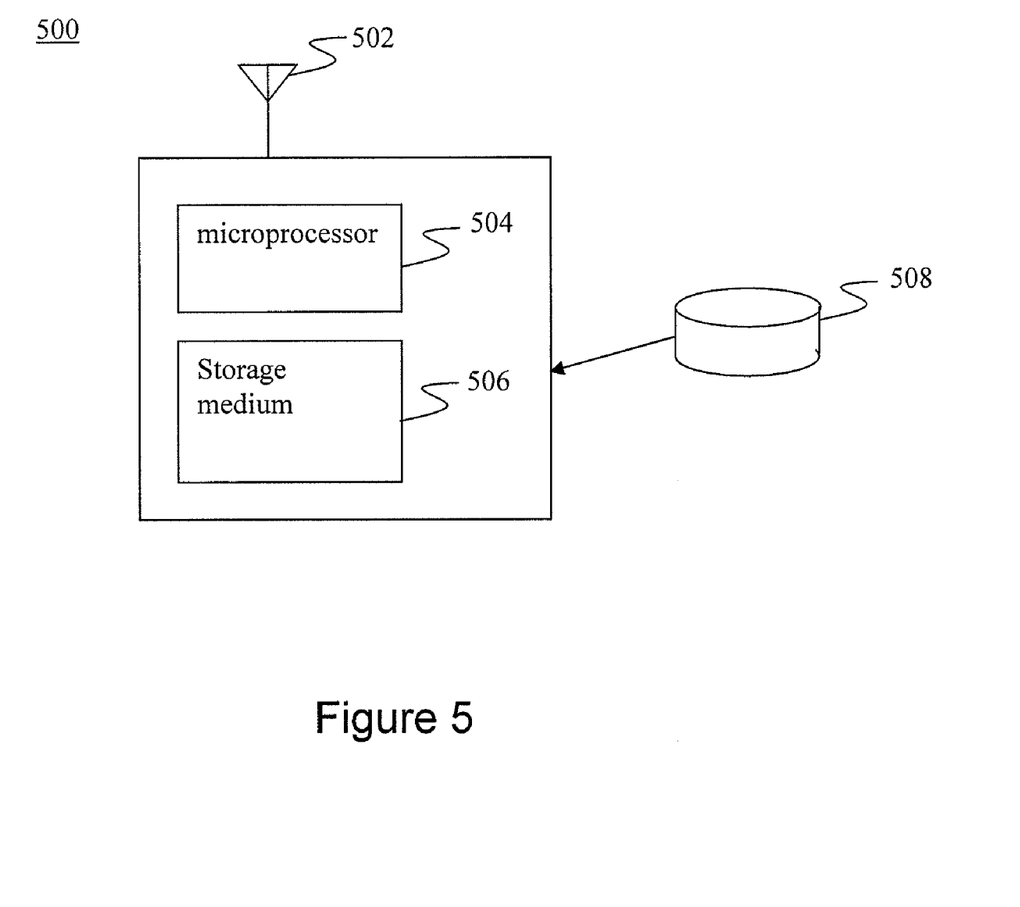
FIG. 5 is a block diagram showing an implementation of any of the preferred embodiments.

No hardware modifications are necessary to realize the present invention in an existing GPS receiver. As for software modifications, the GPS fix computation software module should be augmented with the computation of the defined above $\lambda_{SV_{1,2}}$ and $D_{(SPl,B)}$ when only two satellites are in view. As shown in FIG. 5, a GPS receiver 500 includes an antenna 502, a microprocessor 504 and a storage medium 506, in communication with or integrated into the microprocessor 504, for storing the software. The software can be supplied to the receiver 500 by way of any suitable medium 508. Geofence API functions utilizing the above values should be provided to the geofence application.

As for which parameter to use, $D_{(SPl,B)}$ or $D_{(SLn,B)}$, the user should use the horizontal case if the tracked object is expected to remain in the horizontal plane. The use of $D_{(SPl,B)}$ is more generic.

The situation where only two satellites are visible quite often will correlate with a situation in which only a small aperture of the sky is visible; therefore, the angle between the two visible satellites will often be small. The disadvantage of the small angle between the two satellites is partially compensated by smaller ionospheric and tropospheric errors due to the fact that the ionospheric and tropospheric delays for both satellites will be close.

In the case of an unknown base location, instead of using the base location, we can use a previously computed Solution Plane (base Solution Plane) and measure the minimum distance between the base and current planes.

The best accuracy (precision) would be achieved if the base Solution Plane is originated by the same SVs as the current Solution Plane and the time difference between the computations is not more than a couple of minutes.

Pseudorange dynamic filtering for static receivers can be beneficial in removing thermal noise errors, especially in the case of small angle $\lambda_{SV_{12}}$ where ionospheric error contribution is small. It probably will also filter out free motion receiver's movement around the anchor position.

Another approach to finding the solution plane is to approximate pseudoranges for the current user position with the pseudoranges for the base position using the formulae for the differential of a multivariable function:

$$\rho_i \approx \rho_{i,B} + \left(\frac{\partial}{\partial x}r_i\right)_B (x_U - x_B) + \left(\frac{\partial}{\partial y}r_i\right)_B (y_U - y_B) +$$
$$\left(\frac{\partial}{\partial z}r_i\right)_B \cdot (z_U - z_B) + \left(\frac{\partial}{\partial b}\rho_i\right)_B \cdot (b_U - b_{U,B}) =$$
$$r_{i,B} + b_{U,B} + \frac{x_{S,i} - x_B}{r_{i,B}} \cdot (x_U - x_B) + \frac{y_{S,i} - y_B}{r_{i,B}} \cdot (y_U - y_B) +$$
$$\frac{z_{S,i} - z_B}{r_{i,B}} \cdot (z_U - z_B) + b_U - b_{U,B} = r_{i,B} + \vec{\delta}_U \cdot \vec{1}_{i,B} + b_U$$

The obtained equation is the same as (E60).

The case of a GPS receiver with a normal accuracy on-board clock and two GPS satellites in view should be similar to the case of a GPS receiver with a high accuracy ideal (e.g. atomic) clock and a single GPS satellite in view. In the latter case, one satellite in view is sufficient to determine a distance from the base location to the Solution Surface. Since the receiver's clock ideally does not have a clock bias, we can estimate the true range to the satellite, rather than the pseudorange. The difference of the range to the current position and the range to the base location is the distance from the base location to the Solution Surface, which happens to be a sphere:

$$D_{(SS,B)} = |r_{cur} - r_B|$$

If the base location is the receiver's previous location, $D_{(SS,B)}$ has the meaning of the minimum displacement of the receiver from the previous location.

Figure 6:
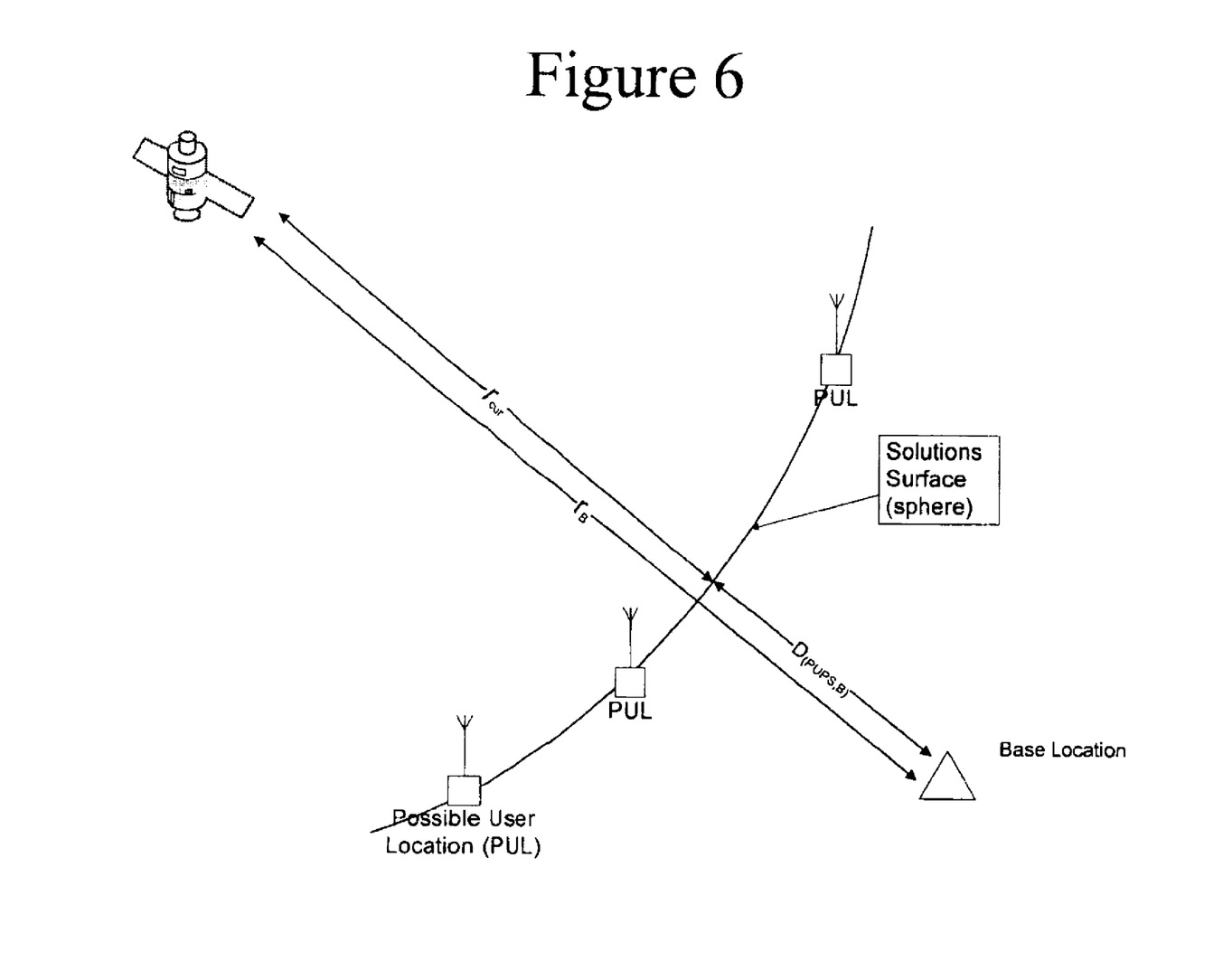
FIG. 6 is a diagram which shows an example of a Solution Surface for another preferred embodiment.

FIG. 6 shows the distance from the base location BL to the Solution Surface SS (which is a sphere) in the case of one satellite SV and a receiver with an ideal clock. The Solution Surface SS is the set of all possible user locations PUL. Any of the variations disclosed above for the preferred embodiment using two satellites can be implemented as well with the preferred embodiment using only one satellite.

While various preferred embodiments of the invention have been disclosed in detail above, those skilled in the art who have reviewed the present disclosure will readily appreciate that other embodiments can be realized within the scope of the invention. For example, a GPS receiver according to the present invention can either have a simple software upgrade from existing receivers or be purpose built. Also, the present invention is not limited to a single example of a global positioning system, but can instead be used with other global positioning systems, such as GLONASS or the Galileo positioning system. Therefore, the present invention should be construed as limited only by the appended claims.

I claim:

1. A method for determining a minimum distance from a global positioning system receiver to a reference location, the method comprising:

(a) receiving at least one global positioning system signal from no more than two global positioning system satellites in the global positioning system receiver;

(b) determining, from the at least one global positioning system signal received in step (a), a set of possible locations at which the global positioning system can be located; and (c) determining a minimum distance from the set of possible locations to the reference location as the minimum distance from the global positioning system receiver to the reference location wherein, in step (a), said at least one global positioning system signal is received from two said global positioning system satellites and wherein step (b) comprises determining a solution plane approximating a solution surface comprising the set of possible locations near the reference location.

2. The method of claim 1, wherein step (c) comprises determining a minimum distance from the solution plane to the reference location.

3. The method of claim 1, wherein the global positioning system receiver is assumed to have a location constraint, and wherein the set of possible locations is determined from the solution plane and the location constraint.

4. The method of claim 3, wherein the location constraint is that the global positioning system receiver is assumed to be on a constraint surface, and wherein the set of possible locations is determined from an intersection of the constraint surface and the solution plane.

5. The method of claim 4, wherein the constraint surface is a horizontal plane.

6. A method for determining a minimum distance from a global positioning system receiver to a reference location, the method comprising:

(a) receiving at least one global positioning system signal from no more than two global positioning system satellites in the global positioning system receiver;

(b) determining, from the at least one global positioning system signal received in step (a), a set of possible locations at which the global positioning system can be located; and (c) determining a minimum distance from the set of possible locations to the reference location as the minimum distance from the global positioning system receiver to the reference location, wherein the reference location is determined from either a previously determined location of the global positioning system receiver or a previously determined solution surface.

7. A method for determining a minimum distance from a global positioning system receiver to a reference location, the method comprising:

(a) receiving at least one global positioning system signal from no more than two global positioning system satellites in the global positioning system receiver;

(b) determining, from the at least one global positioning system signal received in step (a), a set of possible locations at which the global positioning system can be located; and (c) determining a minimum distance from the set of possible locations to the reference location as the minimum distance from the global positioning system receiver to the reference location, wherein the reference location is a geofence anchor location.

8. The method of claim 7, wherein the geofence anchor location has a corresponding geofence radius, and further comprising comparing the minimum distance to the geofence radius to determine whether a geofence crossing even has taken place.

9. A method for determining a minimum distance from a global positioning system receiver to a reference location, the method comprising:
   (a) receiving at least one global positioning system signal from no more than two global positioning system satellites in the global positioning system receiver;
   (b) determining, from the at least one global positioning system signal received in step (a), a set of possible locations at which the global positioning system can be located; and
   (c) determining a minimum distance from the set of possible locations to the reference location as the minimum distance from the global positioning system receiver to the reference location, wherein the reference location is on a route, and further comprising using the minimum distance to determine whether the global positioning system receiver is following the route.

10. The method of claim 9, wherein the route is modeled as a plurality of line segments, and wherein the minimum distance is calculated to each of the line segments.

11. A global positioning system receiver for determining a minimum distance to a reference location, the global positioning system receiver comprising:
   an antenna for receiving at least one global positioning system signal from no more than two global positioning system satellites; and
   a processor, in communication with the antenna, for determining, from the at least one global positioning system signal received by the antenna, a set of possible locations at which the global positioning system can be located; and for determining a minimum distance from the set of possible locations to the reference location as the minimum distance from the global positioning system receiver to the reference location, wherein said at least one global positioning system signal is received from two said global positioning system satellites and wherein the processor determines a solution plane approximating a solution surface comprising the set of possible locations near the reference location.

12. The global positioning system receiver of claim 11, wherein the processor determines a minimum distance from the solution plane to the reference location.

13. The global positioning system receiver of claim 11, wherein the global positioning system receiver is assumed to have a location constraint, and wherein the set of possible locations is determined from the solution plane and the location constraint.

14. The global positioning system receiver of claim 13, wherein the location constraint is that the global positioning system receiver is assumed to be on a constraint surface, and wherein the set of possible locations is determined from an intersection of the constraint surface and the solution plane.

15. The global positioning system receiver of claim 14, wherein the constraint surface is a horizontal plane.

16. A global positioning system receiver for determining a minimum distance to a reference location, the global positioning system receiver comprising:
   an antenna for receiving at least one global positioning system signal from no more than two global positioning system satellites; and
   a processor, in communication with the antenna, for determining, from the at least one global positioning system signal received by the antenna, a set of possible locations at which the global positioning system can be located; and for determining a minimum distance from the set of possible locations to the reference location as the minimum distance from the global positioning system receiver to the reference location, wherein the reference location is either a previously determined location of the global positioning system receiver or a previously determined solution surface.

17. A global positioning system receiver for determining a minimum distance to a reference location, the global positioning system receiver comprising:
   an antenna for receiving at least one global positioning system signal from no more than two global positioning system satellites; and
   a processor, in communication with the antenna, for determining, from the at least one global positioning system signal received by the antenna, a set of possible locations at which the global positioning system can be located; and for determining a minimum distance from the set of possible locations to the reference location as the minimum distance from the global positioning system receiver to the reference location, wherein the reference location is a geofence anchor location.

18. The global positioning system receiver of claim 17, wherein the geofence anchor location has a corresponding geofence radius, and further comprising comparing the minimum distance to the geofence radius to determine whether a geofence crossing even has taken place.

19. A global positioning system receiver for determining a minimum distance to a reference location, the global positioning system receiver comprising:
   an antenna for receiving at least one global positioning system signal from no more than two global positioning system satellites; and
   a processor, in communication with the antenna, for determining, from the at least one global positioning system signal received by the antenna, a set of possible locations at which the global positioning system can be located; and for determining a minimum distance from the set of possible locations to the reference location as the minimum distance from the global positioning system receiver to the reference location, wherein the reference location is on a route, and further comprising using the minimum distance to determine whether the global positioning system receiver is following the route.

20. The global positioning system receiver of claim 19, wherein the route is modeled as a plurality of line segments, and wherein the minimum distance is calculated to each of the line segments.

* * * * *